United States Patent [19]

Galves et al.

[11] 4,023,039

[45] May 10, 1977

[54] LUMINESCENT SCREEN AND IMAGE-CONVERTER TUBES UTILIZING SUCH A SCREEN

[75] Inventors: Jean Pierre Galves; Jean Sagnard, both of Paris, France

[73] Assignee: Thomson-CSF, Paris, France

[22] Filed: Jan. 23, 1975

[21] Appl. No.: 543,277

[30] Foreign Application Priority Data

Jan. 29, 1974 France .................................. 02913

[52] U.S. Cl. ............................. 250/486; 250/483; 250/213 VT; 250/361 R

[51] Int. Cl.² ........................................ H01J 31/50

[58] Field of Search .......... 250/483, 361, 486, 487, 250/488, 362, 364, 367, 213, VT, 350/126, 9, 8

[56] References Cited

UNITED STATES PATENTS

| | | | |
|---|---|---|---|
| 2,495,697 | 1/1950 | Chilowsky | 250/213 VT |
| 2,650,310 | 8/1953 | White | 250/213 VT |
| 3,041,456 | 6/1962 | Macleod | 250/486 |
| 3,253,146 | 5/1966 | De Vries | 250/487 |
| 3,330,981 | 7/1967 | Aia | 250/483 |
| 3,435,222 | 3/1969 | Hotine | 250/483 |
| 3,829,700 | 8/1974 | Buchanan et al. | 250/483 |
| 3,838,273 | 9/1974 | Cusano | 250/486 |

FOREIGN PATENTS OR APPLICATIONS 503,260   5/1954   Canada ............................. 250/483

*Primary Examiner*—Alfred E. Smith
*Assistant Examiner*—Tommy P. Chin
*Attorney, Agent, or Firm*—Roland Plottel

[57] ABSTRACT

In order to avoid losses in definition and contrast which are observed in image-converter tubes as a consequence of the light scatter taking place within the body of the scintillators of the input screens of these tubes, when said scintillators occur in the form of a continuous layer of material, the present invention provides for the formation within a layer of microscopic channels which are transversely disposed, the channels being formed by covering the substrate, prior to the deposition of the scintillator thereon, with a layer of a granular material, preferably glass balls. Application to radiology and scintillography.

6 Claims, 5 Drawing Figures

LUMINESCENT SCREEN AND IMAGE-CONVERTER TUBES UTILIZING SUCH A SCREEN

The present invention relates to a luminescent screen as well as to image-converter tubes utilising such a screen.

The screen comprise a layer of a luminescent material or scintillator, applied to a substrate. The layer is generally employed, for example in tubes of the kind referred to hereinbefore, for the transmission (with associated conversion) of the incident energy towards a second constituent element of the screen, which element is not itself sensitive to this energy. This is the case in particular where a second element consisting of a photocathode sensitive only to radiation in the visible part of the spectrum, or parts adjacent thereto, is used, and where the incident energy takes the form of X-ray or γ radiation, as for example in radiology and in scintillography, or of a neutron stream as in neutronography for example.

This transmission technique gives rise to certain difficulties.

From each point on that face of the luminescent layer which is exposed to the incident energy, there are generated, within the body of the scintillator, photons with which there correspond light-rays distributed within a cone whose apex is located at said point. Thus, there corresponds with a point on the entry face of the scintillator, a zone of a certain size on the face located opposite. Thus, quite obviously, on passage acrosss the scintillator an alteration takes place in the definition of the incident image from which the energy striking the entry face fo the scintillator emanates.

Moreover, the reflections which can occur at the surface of the diopter formed by the scintillator and the medium with which it is in contact, the photo-cathode (or, possibly, as we shall see, the barrier layer) in the case described above, reflects part of said energy towards the entry face of the scintillator. In this context, it should be pointed out that the refractive index of scintillators can readily reach as much as 1.7 to 1.8, a value substantially in excess of that corresponding to the materials of which photo-cathodes and barrier layers are made. The effects of these refractions are to reduce the contrast of the initial image.

Attempts have been made to limit these two drawbacks by giving the scintillator a broken structure made up of a mosaic of tiny islands separated from one another, as in the disclosure of U.S. Pat. No. 3,041,456 where this result is achieved by the use of a substrate in which, prior to the production of the scintillator, there are formed walls designed to provide separations between the said islands, or in the disclosure of French Pat. Application published under No. 2,145,566, where said fragmented structure is achieved by the development of cracks in the layer of luminescent material in the course of its manufacture, by the use of a special manufacturing technique.

Each of these solutions gives rise to difficulties due, in the case of the former, to the laborious procedure of preparing the requisite substrate, although even then it is not always possible to produce the sizes to give the desired island dimensions, and, in the second case, to the stringent precautions which are necessary in the manufacture of the luminescent layer, in order to properly produce the cracks, quite apart from the fact that in all cases it is still necessary to manufacture the substrate.

The present invention relates to a luminescent screen which makes it possible to avoid, or at any rate to reduce in very large measure, the aforesaid drawbacks, the screen being produced by a simpler method than those which are thus far known in particular those disclosed in the aforementioned patent and patent application.

The invention is based upon the utilisation of a supplementary layer, additional to those comprised in the prior art screens, said layer being of a granular material incorporated into the screen and promoting the attainment of the desired fragmentary structure.

The invention will be better understood from a consideration of the ensuing description and the attached figures where:

Figure 1:
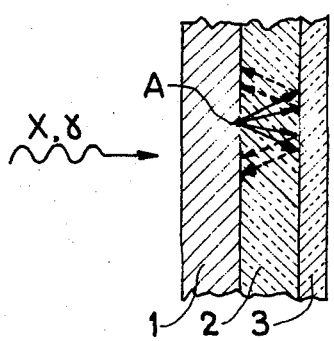
FIG. 1 is a schematic section relating to the invention.

The schematic section of FIG. 1 illustrates the appearance of a luminescent screen utilised for the conversion of incident energy, assumed in the example of the figure to be that constituted by X-ray or γ radiation, into light energy capable of acting upon a photo-cathode sensitive to radiation occuring in the visible spectrum. To a substrate 1, for example of aluminium, there is applied to a scintillator in the form of a continuous layer 2 of a luminescent material, an alkaline halide as for example cesiumiodide, potassium-iodide, sodium-iodide, following which there is applied upon this layer a further layer 3 of a photosensitive material; for example a complex compound of antimony and an alkaline metal, cesium, potassium, rubidium for instance, in the manner employed in accordance with the prior art.

From each point such as that marked A in the figure, on that face of the scintillator 2 which is exposed to the incident radiation, there are produced, within the body of said layer, photons with which there generally correspond, in the case of conversion of the incident energy into a radiation in the light spectrum, light rays represented by the small full-line arrows directed towards the opposite face of the scintillator. In fact, this conversion takes place at all levels within the thickness of the scintillator and it is purely in order to simplify matters that the point A has been picked out and the rays associated with that point. As the figure shows, when the scintillator takes the form of a layer of continuous material within the body of which there is nothing to modify the path of the rays, there thus corresponds with the point A on the entry face of the scintillator a spot on the opposite face thereof, of tangible dimensions coincidental with the base of a cone of apex A as shown in the figure.

Moreover, reflections at the surface separating the scintillator 2 and the photo-cathode 3, result in part of said light being reflected towards the entry face of the scintillator. These reflections are the more substantial the higher the refractive index of the scintillator is, other things being equal of course. However, this refractive index is normally between 1.7 and 1.8 in the case of the halogen compound referred to before, that is to say is in excess of that of the photo-cathode materials of which the barrier layer (not shown) is made, this latter layer possibly being arranged for chemical reasons between the scintillator and the photo-cathode. The reflected rays are indicated by small dotted arrows.

The two above facts are the reasons for the loss of definition and contrast mention of which has been earlier on.

Figure 2:
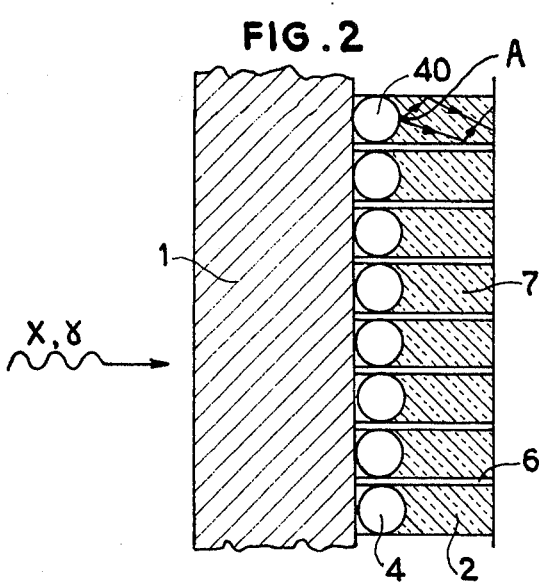
FIG. 2 is a schematic section of a luminescent screen in accordance with the invention.
Figure 3:
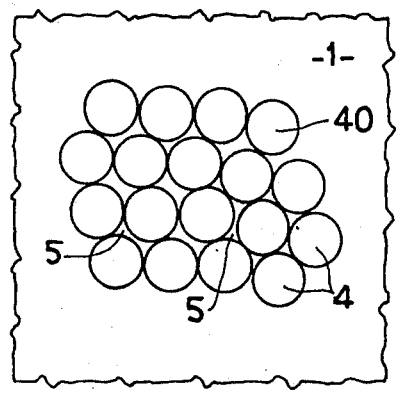
FIG. 3 is a plan view illustrating the layer of granular material incorporated into the screens of the invention.

FIG. 2 illustrates in section a fragment of a luminescent screen in accordance with the invention, showing only those of its elements which are essential to an understanding of the invention. In this figure, there can be seen the substrate 1 and the scintillator 2. There can also be seen, between the substrate and the scintillator, a single layer 40 of a granular material, with substantially spherical grains 4, which has the appearance, viewed in plan, shown in FIG. 3. The interstices between the grains 4 are marked 5 in FIG. 3. At the time of manufacture of the scintillator 2, using one of the known techniques, the material of the layer 2, which is deposited upon the grains 4, exhibits, as FIG. 2 shows and at the location of the interstices 5, microscopic channels 6 separating from one another islands of luminescent material 7. These islands, in the case of spherical grains 4, generally take the form of cylindrical rod-like formations, 150 to 200/um in length, surmounting the spherical grains 4, as shown in the drawing. Each of these rod-like formations constitutes a guide for the lightwaves generated within the body of the scintillator by the incident energy of an X-ray or γ radiation for example. Because of the high refractive index of the normal scintillator materials, 1.7 to 1.8 as already mentioned, the presence of the microscopic channels 6 within the body of the layer 2 has the effect, by total reflection at the walls of the rodlike formations, of limiting the lateral scattering of the lightwaves passing from the entry face of the scintillator towards its exit face which is in contact with the photo-cathode (not shown), in the manner indicated by the arrows issuing from the point A in FIG. 2. The presence of these channels in the same way limits the number of rays reflected at the separating surface defined between the scintillator and the photo-cathode, which reach the entry face of the scintillator.

The light spot produced at the exit face of the scintillator and corresponding to all the points such as those A within a rod formation, is limited to the section of this rod formation.

To give some idea of the degree of limitation thus achieved, it is worthy of note that the grains 4, preferably spherical in form as indicated, have a dimension of the order of some few tens of microns, 20/um to 70/um, depending upon the dimensions of the tubes into which said screens are incorporated and upon the characteristics it is desired to achieve. A highly selective sorting operation makes it possible to achieve a small degree of spread around the selected dimension.

With this grain dimension there correspond channels 6 which have a size transversely of the rod formations, of some few tens of nanometers up to some few microns.

Figure 4:
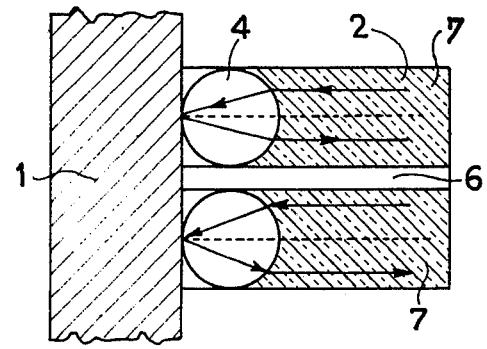
FIG. 4 is an enlarged part of FIG. 2.

In a preferred embodiment of the invention, these spheres or balls are of glass. The glass used is one chosen from the system of oxides listed hereafter, PbO, $TiO_2$, BaO, $Al_2O_3$, $B_2O_3$, ZnO. The refractive indices of these glasses range between 2 and 2.1 and this introduces a supplementary advantages of the luminescent screens in accordance with the invention. Because of the high value of this refractive index, the light rays going in the direction opposite to the photo-cathode, experience total refraction at the interior of the spheres 4 which behave as a catadiopter incorporated into the screen, and the rays are therefore reflected towards the photo-cathode in the manner indicated in FIG. 4.

In addition, because of its chemically inert nature, the glass of these balls produces a chemical barrier effect between the material of the scintillator and that of the substrate. Those skilled in the art will be aware that the substrate can be of glass and, in this case, there is little fear of chemical reactions taking place between the substrate and the scintillator: however, it is well known that in the case of incident X-ray or γ radiation for example, the substrate is preferentially made of metal, aluminium or beryllium for example. In this case, protection of the scintillator material against chemical action of the substrate, is required; this is achieved by the single layer 40 of balls 4 which play the part of a barrier layer.

One method of preparing luminescent screens in accordance with the invention has been indicated hereinafter. The description will be confined primarily to the method of manufacturing the layer 40, the remainder of the manufacturing operations falling within the prior art.

Upon a substrate 1, for example of aluminium, in the form of a spherical cap, there is deposited, for example by a process of painting, a thin layer (some few microns in thickness) of an organic binder of the methacrylate type for example. On said latter there is spread a single layer, as FIG. 2 shows, of balls of glass having the above-indicated composition. These balls are maintained in position on the substrate by the binder for the whole of the time for which an atomising operation using sodium silicate is employed to cover them, the atomised sodium silicate being applied to the free faces of the balls; the silicate ensures that there is cohesion between the balls themselves and between them and the substrate in the finished screen. Then, using one of the known techniques, a layer of cesium iodide doped with an activator in a manner known per se and measuring 150 to 200/um in thickness, is deposited in order to constitute the scintillator, the technique involving vaporisation under vacuum for example. This thickness should be sufficient to ensure that the major part of the incident radiation is converted into photons. During this operation, the temperature is maintained below 200° C. The system is then passed through a tunnel furnace and undergoes a cycle comprising a temperature rise to 360° C over 30 minutes, a step of 30 minutes at this temperature and a phase of cooling lasting between one and two hours. During this operation, the organic binder is virtually eliminated.

The preparation of the screen is completed by depositing upon the scintillator the layer of photosensitive material 3, referred to in FIG. 1, this consisting of a complex compound of antimony and alkaline metals for example, covering the scintillator for a thickness of around $100^4$; a barrier layer is possibly arranged between the scintillator and the photo-cathode 3 in order to prevent chemical reactions between these two elements; finally, another possible step is to form a layer of electrically conductive material underlying the photo-cathode in order, in operation, to fix the potential of the screen and to ensure the return of electrons emitted by the photo-cathode. In the case of photo-cathodes made of alkaline antimonides, as referred to earlier, the electrical conductivity of the material should be sufficient to prevent the need for any electrically conductive layer which is separate from the photo-cathode.

Figure 5:
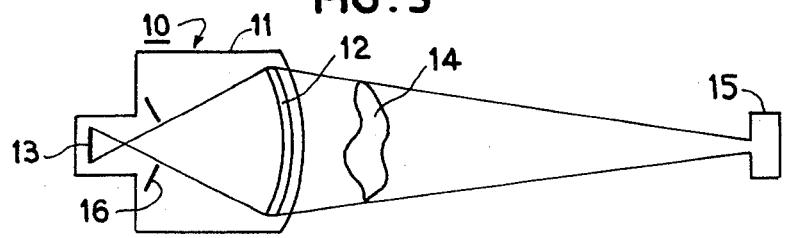
FIG. 5 is a schematic section through an image-converter tube utilising by way of input screen a screen in accordance with the invention.

The screen is then ready for assembly in an image-converter tube for example, such as the one illustrated schematically in section in FIG. 5 where 10 designates the image-converter tube comprising, within an envelope 11 which is evacuated, an input screen 12 in accordance with the invention and an output screen 13. The object whose image is to be observed on the output screen 13, is marked at 14. It is subjected to the X-ray beam delimited by the two oblique lines at the right-hand side of the figure and coming from the source 15. This image is formed, as those skilled in the art will appreciate, by impact upon the exit screen 13 of electrons coming from the photo-cathode which is experiencing the X-ray radiation, the electrons being accelerated towards the output screen 13 by a possible voltage applied to said screen in relation to the input screen. In the figure, 16 illustrates in a schematic fashion the electrodes arranged in the trajectory of the electron beam delimited by the two oblique lines located inside the envelope. The voltage source has not been shown in the figure.

Of course, the invention is not limited to the embodiment described and shown which was given solely by way of example.

What is claimed is:

1. A luminescent screen comprising a layer of luminescent material applied to a substrate characterized in that between said layer and said substrate there is arranged a layer of a granular material which consists of a single layer of glass balls (4) separate from each other by interstices (5) whereby islands of luminescent material separated by microscopic channels (6) are formed in the luminescent layer.

2. A luminescent screen as claimed in claim 1, characterized in that said balls have a diameter ranging between 20 and 70/um.

3. A luminescent screen as claimed in claim 1, characterized in that said luminescent material is an alkaline halide.

4. A luminescent screen as claimed in claim 3, characterized in that said luminescent material is cesium iodide, CsI.

5. A screen according to claim 1 for an X-ray image converter tube, further comprising within a evacuated envelope an output screen, and said luminescent screen being provided with a layer of photosensitive material characterized in that said layer of photosensitive material is deposited upon said layer of luminescent material.

6. An image-converter tube for radioscopic images, comprising an input screen subjected to the incident X-ray radiation and an output screen opposite the former upon which output screen there is formed a visible image of said radiation, characterized in that said input screen is a screen as claimed in claim 5.

* * * * *